Figure 1:
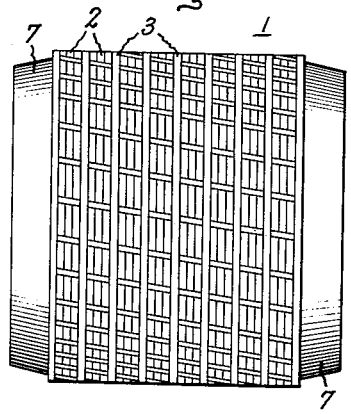

Aug. 11, 1953    F. H. FLEISCHER    2,648,788
ROTOR FOR DYNAMOELECTRIC MACHINE
Filed Sept. 20, 1950

Inventor:
Frank H. Fleischer,
by Ernest H. Britton
His Attorney.

Patented Aug. 11, 1953

2,648,788

UNITED STATES PATENT OFFICE 2,648,788

ROTOR FOR DYNAMOELECTRIC MACHINES

Frank H. Fleischer, Fort Wayne, Ind., assignor to General Electric Company, a corporation of New York Application September 20, 1950, Serial No. 185,760

17 Claims. (Cl. 310—51)

This invention relates to rotors for dynamo electric machines and more particularly induction motor rotors of the squirrel cage type.

In the design of squirrel cage rotors for induction motors, especially for use in domestic appliances, the reduction of noise is particularly important. It has been found that rotors having open slots have a characteristic high frequency noise while rotors with closed slots have a characteristic low frequency noise usually modulated at slip frequency. It is therefore desirable to provide a squirrel cage rotor in which both the high and the low frequency noise components are reduced to a minimum level. In the course of studies made on rotors having totally closed slots, it was determined that both high and low frequency noise were reduced to the minimum by reducing the thickness of the bridge section of the laminations over the squirrel cage bars. However, from a manufacturing standpoint, it was found to be practically impossible to provide punched laminations having the bridge thickness desired without encountering such unwanted percentage variations as to make the design unusable. It is therefore desirable to provide a squirrel cage rotor design wherein the bridge thickness is reduced to the desired amount without exceeding the limits of practical manufacturing tolerances.

An object of this invention is to provide an improved squirrel cage rotor assembly.

Another object of this invention is to provide an improved squirrel cage rotor assembly wherein both high and low frequency noise components are reduced to the minimum level.

A further object of this invention is to provide an improved squirrel cage rotor assembly wherein the effective bridge thickness over the squirrel cage bars can be satisfactorily maintained in production.

Further objects and advantages of this invention will become apparent and the invention will be better understood by reference to the drawing and the following description, and the features of novelty which characterize this invention will be pointed out with particularity in the claims annexed to and forming a part of this specification.

In accordance with one aspect of this invention, a squirrel cage rotor assembly is provided comprising a plurality of laminations having open slots and a plurality of other laminations having totally closed slots. The closed slot laminations may be interleaved with the open slot laminations across the axial length of the rotor to provide the desired equivalent bridge thickness for reducing high and low frequency noise components. It has been found that the number of open slot laminations should exceed the number of closed slot laminations, a range of from about 50% to about 85% open slot laminations producing satisfactory results. Instead of interleaving the closed and open slot laminations across the axial length of the rotor, it may be found more convenient in manufacturing to group the closed slot laminations together. Furthermore, rather than provide two sets of punchings having open and totally closed slots respectively, a single type of lamination may be used, each lamination having a number of open slots and a number of totally closed slots.

Figure 4:
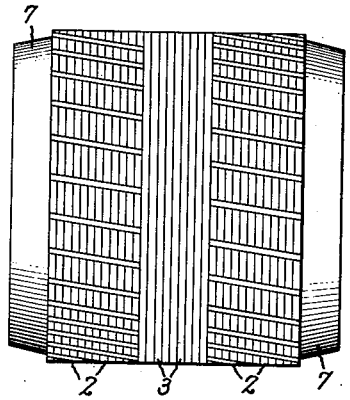
Figure 2:
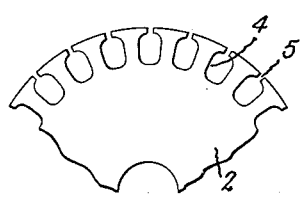
Figure 3:
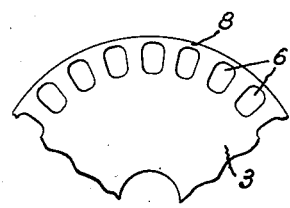
Figure 5:
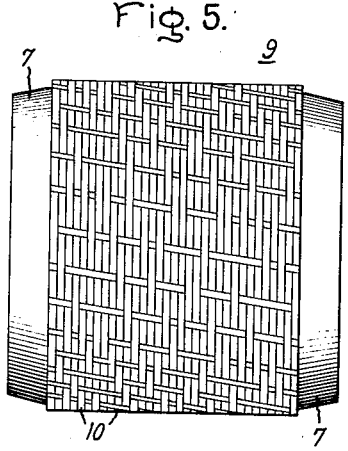
Figure 6:
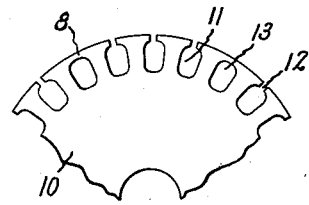

In the drawing, Fig. 1 is a side elevational view of an induction motor rotor having the improved construction of this invention; Fig. 2 is a fragmentary view illustrating the open slot laminations used in the rotor of Fig. 1; Fig. 3 is another fragmentary view illustrating the totally closed slot laminations used in the rotor of Fig. 1; Fig. 4 illustrates a modified form of the invention wherein the totally closed slot laminations are grouped together; Fig. 5 illustrates a further modification of this invention in which only one type of lamination is used; and Fig. 6 is a fragmentary view illustrating a lamination of the type used in the rotor of Fig. 5.

Referring now to Figs. 1, 2 and 3 there is shown a squirrel cage induction motor rotor 1 formed of a plurality of open slot laminations 2 and a plurality of closed slot laminations 3. As shown in Fig. 2 the open slot laminations 2 are provided with a plurality of slots 4 for receiving the squirrel cage bars of the rotor, these slots having openings 5 interconnecting the slot 4 and the outer periphery of the lamination. As shown in Fig. 3 the totally closed slot laminations 3 are provided with a plurality of totally closed slots 6 which do not communicate with the outer periphery of the lamination. In accordance with this form of the invention, the closed slot laminations 3 are interleaved between the open slot laminations 2 across the axial length of the rotor. After the laminations have been stacked, squirrel cage bars are arranged in the slots 4 and 6 of the laminations 2 and 3, as by casting, and end rings 7 complete the squirrel cage winding.

It will now be readily seen that the utilization of both open and closed slot laminations in the same rotor will reduce the effective average thickness of the bridge section 8 over the rotor bars from that which would be provided if the rotor was formed completely of totally closed slot laminations of the type shown in Fig. 3. It will also be readily apparent that the ratio between the number of laminations with totally closed slots and the number with open slots will determine the equivalent bridge thickness. The equivalent bridge thickness can therefore be simply adjusted to any desired value by varying the ratio between the number of punchings of the type shown in Fig. 2 and the number of the type shown in Fig. 3. While it would be practically impossible from a manufacturing standpoint to reduce the thickness of the bridge 8 in punchings 3 to the desired value, this improved construction permits the use of the optimum bridge thickness to secure minimum noise since punchings of the type shown in Figs. 2 and 3 may be both produced without undue manufacturing difficulties. It has been found that a ratio of from 50% to 85% open slot laminations 2 will provide a satisfactory construction in which high and low frequency noise are at a minimum and that in the rotors of the type used in hermetic refrigerator compressor assemblies, a ratio of 3 open slot laminations to 1 closed slot lamination produce the best results. While Fig. 1 shows the open and closed slot laminations uniformly interleaved, i. e. with one closed slot lamination 3 following three open slot laminations 2, satisfactory results may be obtained by stacking these laminations at random.

Manufacturing difficulties may be encountered in uniformly interleaving the open slot laminations 2 and closed slot laminations 3 as shown in Fig. 1. Therefore, the totally closed slot laminations 3 may be grouped together as shown in Fig. 4.

In the construction of Figs. 1 to 4 inclusive, two types of laminations are needed, i. e. open slot laminations 2 and totally closed slot laminations 3. It may be desirable to provide a construction producing the superior noise reduction characteristics of Figs. 1 to 4 inclusive, however utilizing a single type of lamination. Referring now to Figs. 5 and 6, there is shown a squirrel cage induction motor rotor 9 in which a single type of lamination 10 is utilized. Here, each lamination 10 is provided with a plurality of open slots 11 having openings 12 communicating with the outer periphery of a lamination and a plurality of totally closed slots 13 which do not communicate with the outer periphery of the lamination. It has been found that the same ratios prevail in laminations of the types shown in Fig. 6 as in the construction of Figs. 1 to 4 inclusive, i. e., a ratio of from about 50% to about 85% open slots produces satisfactory operation. Here again, a ratio of three open slots 11 to one totally closed slot 13 was found to produce the best results in a hermetic refrigerator rotor. As shown in Fig. 5, the laminations 10 may be stacked at random or in a definite sequence. However, the laminations should be arranged so that all of the openings 11 of each lamination are not aligned axially with all corresponding openings 11 of the other laminations. It has been found that for the best results in the reduction of noise, it is desirable that the laminations of the type shown in Fig. 6 be arranged in a definite sequence, or in an equivalent sequence so that there are the same number of bridges 8 along the axial length of each commutator bar.

It will now be readily apparent that the improved rotor construction of this invention permits the effective bridge thickness over the squirrel cage bars to be reduced to a value now considered impractical by present manufacturing methods. The use of this construction has been found to greatly reduce to a minimum both the high frequency and low frequency noise components commonly encountered in induction motor rotors having either all closed or all open slots. Furthermore, the bridge thickness of the closed slot punchings can be set at a satisfactory value for manufacturing purposes since the effective bridge thickness of the complete rotor assembly is controlled by the number of open slot laminations provided. Also, the effective bridge thickness can be changed at will by changing the ratio of open slot to closed slot laminations without changing the die construction.

While I have illustrated and described specific embodiments of this invention, further modifications and improvements will occur to those skilled in the art. I desire it to be understood therefore that this invention is not limited to the particular embodiments shown and I intend in the appended claims to cover all modifications within the spirit and scope of this invention.

What I claim as new and desire to secure by Letters Patent of the United States is:

1. A squirrel cage rotor assembly comprising a plurality of laminations having open slots and a plurality of other laminations having totally closed slots, and a cast squirrel cage winding in said slots, said closed slot laminations being interleaved with said open slot laminations across the axial length of said rotor whereby the effective noise level is reduced.

2. A squirrel cage rotor assembly comprising a plurality of laminations having open slots and a plurality of other laminations having totally closed slots, and a cast squirrel cage winding in said slots, there being a smaller number of closed slot laminations than open slot laminations whereby the effective noise level is reduced.

3. A squirrel cage rotor assembly comprising a plurality of laminations having open slots and a plurality of other laminations having totally closed slots, and a cast squirrel cage winding in said slots, said open slot laminations comprising from about 50% to about 85% of the total number of laminations whereby the effective noise level is reduced.

4. A squirrel cage rotor assembly comprising a plurality of laminations having open slots and a plurality of other laminations having totally closed slots, and a cast squirrel cake winding in said slots, said closed slot laminations being interleaved with said open slot laminations across the axial length of said rotor, there being a smaller number of closed slot laminations than open slot laminations whereby the effective noise level is reduced.

5. A squirrel cage rotor assembly comprising a plurality of laminations having open slots and a plurality of other laminations having totally closed slots, and a cast squirrel cake winding in said slots, said closed slot laminations being interleaved with said open slot laminations across the axial length of said rotor, said open slot laminations comprising from about 50% to about 85% of the total number of laminations whereby the effective noise level is reduced.

6. A squirrel cage rotor assembly comprising a plurality of laminations having open slots and a plurality of other laminations having totally closed slots, and a cast squirrel cage winding in said slots, there being a smaller number of closed slot laminations than open slot laminations, all of said closed slot laminations being arranged together in a group whereby the effective noise level is reduced.

7. A squirrel cage rotor assembly comprising a plurality of laminations having open slots and a plurality of other laminations having totally closed slots, and a cast squirrel cage winding in said slots, said open slot laminations comprising from about 50% to about 85% of the total number of laminations, all of said closed slot laminations being arranged together in a group whereby the effective noise level is reduced.

8. A squirrel cage rotor assembly comprising a plurality of laminations, said laminations having a plurality of open slots and a plurality of totally closed slots, and a cast squirrel cage winding in said slots, there being a smaller number of closed slots than open slots whereby the effective noise level is reduced.

9. A squirrel cage rotor assembly comprising a plurality of laminations, said laminations having a plurality of open slots and a plurality of totally closed slots, and a cast squirrel cage winding in said slots, said open slots comprising from about 50% to about 85% of the total number of slots of said laminations whereby the effective noise level is reduced.

10. A squirrel cage rotor member having a plurality of open slots and a plurality of totally closed slots, there being a smaller number of closed slots than open slots whereby the effective noise level is reduced.

11. A squirrel cage rotor member having a plurality of open slots and a plurality of totally closed slots, and a cast squirrel cage winding in said slots, said open slots comprising from about 50% to about 85% of the total number of slots of said laminations whereby the effective noise level is reduced.

12. A squirrel cage rotor assembly comprising a plurality of laminations, each of said laminations having a plurality of open slots and a plurality of totally closed slots, and a cast squirrel cage winding in said slots, there being a smaller number of closed slots than open slots whereby the effective noise level is reduced.

13. A squirrel cage rotor assembly comprising a plurality of laminations, each of said laminations having a plurality of open slots and a plurality of totally closed slots, and a cast squirrel cage winding in said slots, said open slots comprising from about 50% to about 85% of the total number of slots in each lamination whereby the effective noise level is reduced.

14. A squirrel cage rotor assembly comprising a plurality of laminations, each of said laminations having a plurality of open slots and a plurality of totally closed slots, and a cast squirrel cage winding in said slots, said laminations being staggered so that all of said open slots of each lamination are not in axial alignment with all the open slots of all other laminations whereby the effective noise level is reduced.

15. A squirrel cage rotor assembly comprising a plurality of laminations, each of said laminations having a plurality of open slots and a plurality of totally closed slots, and a cast squirrel cage winding in said slots, said open slots comprising from about 50% to about 85% of the total number of slots in said laminations, said laminations being staggered so that all of said open slots of each lamination are not in axial alignment with all of the open slots of all other laminations whereby the effective noise level is reduced.

16. A squirrel cage rotor assembly comprising a plurality of laminations, each of said laminations having a plurality of open slots and a plurality of totally closed slots, and a cast squirrel cage winding in said slots, there being a smaller number of closed slots than open slots, said laminations being staggered so that all the said open slots of each lamination are not in axial alignment with all the open slots of all the other laminations whereby the effective noise level is reduced.

17. A squirrel cage rotor assembly comprising a plurality of laminations, each of said laminations having a plurality of open slots and a plurality of other slots closed by bridge sections, and a cast squirrel cage winding in said slots, said laminations being arranged so that there are the same number of said bridges along the axial length of each of said squirrel cage bars.

FRANK H. FLEISCHER.

References Cited in the file of this patent

UNITED STATES PATENTS

| Number | Name | Date |
|---|---|---|
| 1,302,040 | Hellmund | Apr. 29, 1919 |
| 1,945,028 | D'Almaine et al. | Jan. 30, 1934 |
| 2,047,831 | Lund | July 14, 1936 |
| 2,139,748 | Harrell | Dec. 13, 1938 |